(12) United States Patent
Chun (10) Patent No.: US 9,521,034 B2
(45) Date of Patent: Dec. 13, 2016

(54) METHOD AND APPARATUS FOR GENERATING RESOURCE ADDRESS, AND SYSTEM THEREOF

(71) Applicant: Shenzhen Development Promotion Centre For Enterprises, Shenzhen (CN)

(72) Inventor: Jimmy Chun, Shenzhen (CN)

(73) Assignee: SHENZHEN DEVELOPMENT PROMOTION CENTRE FOR ENTERPRISES, Shenzhen, Guangdong (CN)

(*) Notice: Subject to any disclaimer, the term of this patent is extended or adjusted under 35 U.S.C. 154(b) by 170 days.

(21) Appl. No.: 14/451,942

(22) Filed: Aug. 5, 2014

(65) Prior Publication Data

US 2015/0304156 A1    Oct. 22, 2015

(30) Foreign Application Priority Data

Apr. 22, 2014    (CN) .......................... 2014 1 0164234

(51) Int. Cl.
| | |
|---|---|
| *H04L 12/24* | (2006.01) |
| *H04L 29/06* | (2006.01) |
| *H04L 12/751* | (2013.01) |
| *H04L 29/08* | (2006.01) |

(52) U.S. Cl.
CPC .......... *H04L 41/0293* (2013.01); *H04L 45/02* (2013.01); *H04L 67/02* (2013.01); *H04L 67/22* (2013.01); *H04L 69/22* (2013.01)

(58) Field of Classification Search
CPC ...... H04L 41/0293; H04L 45/02; H04L 67/02; H04L 67/22; H04L 69/22; H04L 67/06; H04L 67/104; H04L 67/1097; H04L 43/08; H04L 43/10; H04L 9/32; H04L 29/08099; H04L 29/12009; H04L 12/30283; H04L 21/632
USPC ............... 370/252, 241, 381, 386, 389, 392, 370/400–401, 412; 709/206, 220, 709/223–224; 705/30, 51, 14.25, 14.61, 705/14.66, 14.72
See application file for complete search history.

(56) References Cited

U.S. PATENT DOCUMENTS

| | | | | |
|---|---|---|---|---|
| 2011/0137736 A1* | 6/2011 | Soza | ..................... | G06Q 30/02 705/14.73 |
| 2013/0124644 A1* | 5/2013 | Hunt | ..................... | H04L 51/12 709/206 |
| 2014/0025465 A1* | 1/2014 | Herring | ................. | G06Q 30/02 705/14.25 |

(Continued)

*Primary Examiner* — Mohamed Kamara
(74) *Attorney, Agent, or Firm* — Leason Ellis LLP (57) ABSTRACT

A method, apparatus, and system for generating a resource address. The method comprises: configuring a propagation path parameter in the resource address; and updating the propagation path parameter in a resource propagation process according to a login state and an identifier of a user propagating the resource address, and returning the updated resource address to a client that the user logs in to; wherein the propagation path parameter is used to uniquely identify a primary propagation behavior between a propagator of the resource address and a previous propagator thereof. By configuring the propagation path parameter in the resource address and updating the propagation path parameter in the resource address propagation process, embodiments implement propagation path tracking of the resource address, facilitate acknowledgement of the propagation of the resource address, and perform a statistical collection for and an analysis on the propagation path of the resource address.

5 Claims, 4 Drawing Sheets (56) References Cited

U.S. PATENT DOCUMENTS

2014/0279061 A1* 9/2014 Elimeliah ............ G06Q 50/01
                                                                   705/14.72

* cited by examiner

METHOD AND APPARATUS FOR GENERATING RESOURCE ADDRESS, AND SYSTEM THEREOF

This application is based on Chinese Patent Application No. 201410164234.X filed with the Chinese Patent Office on Apr. 22, 2014, the entire content of which is hereby incorporated by reference.

FIELD OF THE INVENTION

The present invention relates to the field of the Internet, and in particular to, a method and apparatus for generating a resource address, and a system thereof.

BACKGROUND OF THE INVENTION

A uniform resource locator (URL) is a brief expression of a location where a resource can be acquired and an access method therefor, and is a resource address of a standard resource on the Internet. Each resource on the Internet is assigned a unique resource address, which comprises information specifying the location of the resource and how a related application program, for example, a browser processes the resource, and has been formulated in the Internet standards RFC 1738 by the World Wide Web Consortium.

Various resource platforms, for example, news websites, video websites, and music websites, are available on the Internet, and meanwhile more and more social networking platforms are being pushed. These platforms provide abundant resources, and the resources all have a corresponding resource address. Users access content of the resource via the resource address, and propagate the resource address over the Internet via sharing and forwarding and the like.

Currently, during a propagation of the resource address over the Internet, the propagation path of the resource address cannot be tracked, which is unfavorable to conducting statistical collection and analysis on the propagation of the resource address.

SUMMARY OF THE INVENTION

Embodiments of the present invention provide a method for generating a resource address, to solve the problem that it is hard to track a propagation path of the resource address.

An embodiment of the present invention provides a method for generating a resource address. The method comprises:

configuring a propagation path parameter in the resource address; and updating the propagation path parameters in a resource propagation process, according to a login state and an identifier of a user who propagates the resource address, and returning the updated resource address to a client that the user logs in to;

wherein the propagation path parameter is used to uniquely identify a primary propagation behavior between a propagator of the resource address and a previous propagator thereof.

An embodiment of the present invention provides an apparatus for generating a resource address. The apparatus comprises:

a propagation path parameter configuring unit, adapted to configure a propagation path parameter in the resource address; and a resource address updating unit, adapted to update the propagation path parameter in a resource propagation process, according to a login state and an identifier of a user who propagates the resource address, and return the updated resource address to a client that the user logs in to;

wherein the propagation path parameter is used to identify a propagation behavior between a propagator of the resource address and a previous propagator thereof.

An embodiment of the present invention provides a resource propagation system. The system comprises an apparatus for generating a resource address.

The apparatus for generating a resource address comprises:

a propagation path parameter configuring unit, adapted to configure propagation path parameters in the resource address; and a resource address updating unit, adapted to update the propagation path parameters in a resource propagation process, according to a login state and an identifier of a user propagating the resource address, and return the updated resource address to a client that the user logs in to;

wherein the propagation path parameter is used to identify a propagation behavior between a propagator of the resource address and a previous propagator thereof.

By configuring the propagation path parameter in the resource address and updating the propagation path parameter in the resource address propagation process, embodiments of the present invention implement propagation path tracking of the resource address, facilitate acknowledgement of the propagation of the resource address, and perform a statistical collection for and an analysis on the propagation path of the resource address.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

To make the objective, technical solution, and advantages of the present invention more clear, the present invention is further described with reference to specific embodiments and attached drawings. It should be understood that the embodiments described herein are only exemplary ones for illustrating the present invention, and are not intended to limit the present invention.

According to the embodiments of the present invention, at least one corresponding propagation path parameter configured in a resource address, wherein the propagation path parameter is used to uniquely identify a primary resource address propagation behavior between the propagator of the resource address and the previous propagator thereof; the propagation path parameter is updated according to the propagation of the resource address, such that the propagation path of the resource address is conveniently tracked and recorded.

Figure 1:
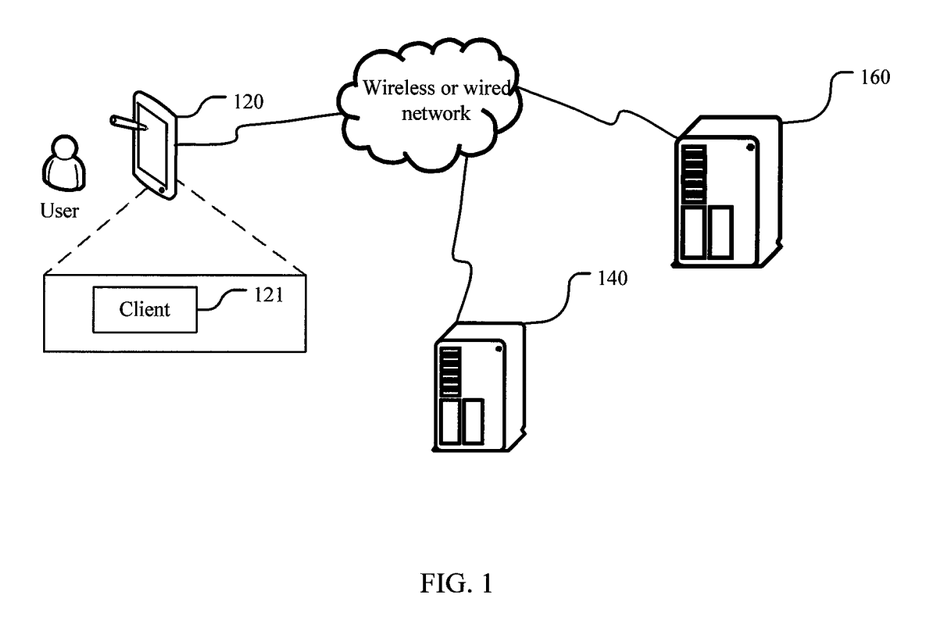
FIG. 1 is a schematic structural view of an implementation environment of a method for generating a resource address according to an embodiment of the present invention.

FIG. 1 illustrates an implementation environment of a method for generating a resource address according to an embodiment of the present invention. The implementation environment comprises a plurality of clients 121 running on a terminal device 120, a content server 140, and a resource propagation server 160.

The clients 121 run on the terminal device 120 of the user, and may be provided by a content service provider, for example, a browser client, a forum client, an email client, a Weibo (microblog) client, or an entertainment client, an online audio player client, an online video player client, and the like.

The terminal device 120 may be a personal computer, a smart television, a smart phone, a tablet computer, an electronic book reader, a Moving Picture Experts Group Audio Layer III (MP3) player, a Moving Picture Experts Group Audio Layer IV (MP4) player, a TV, a laptop computer, a desktop computer, and the like.

The content server 140 stores content of resources propagated over the Internet, and the content may be stored in formats of text, audio, video, picture, and the like.

The resource propagation server 160 generates resource addresses of the content stored on the content server 140, and may communicate with the clients 121 over a wired network or a wireless network. The user acquires the resource address of content from the resource propagation server 160 via the clients 121, and acquires corresponding content from the content server 140 via the resource address, and then browses, downloads or plays the content.

In the embodiments of the present invention, the resource propagation server 160 configures at least one propagation path parameter of a resource address in the resource address of the content, wherein the parameter is used to uniquely mark a primary propagation behavior between a propagator of the resource address and a previous propagator thereof.

As a preferred embodiment of the present invention, the propagation path parameter comprise the following information:

a propagator parameter, used to identify a user that logs in to a client and propagates a current resource address, which indicates who propagates the resource address and is generally constituted by a user identifier that is used for the login; wherein if the resource is original content, the propagator refers to a content provider;

a previous propagator parameter, used to identify a previous propagator of the current resource address, which indicates who previously propagates a resource address propagated by the current propagator; wherein the resource address carries this parameter, to enable the server to track the propagation path of the resource address to acquire the propagation of the resource address; and a propagation behavior identifier, used to identify a primary resource address propagation behavior between the propagator and the previous propagator; wherein this parameter, in combination with the previous propagator parameter, may be used for a retrospective analysis on the propagation path.

For example, A separately propagates the same resource address propagated by B and C, D propagates the resource address propagated by A; in this case, if no propagation behavior identifier is defined, the server may fail to track back a correct propagation path of the resource address because the propagation path may be: B→A→D or C→A→D.

In the embodiments of the present invention, the propagator parameter, the previous propagator parameter, and the propagation behavior identifier comprised in the propagation path parameters may be implemented in a plurality of manners. For example:

1. The propagator parameter, the previous propagator parameter, and the propagation behavior identifier are configured in the resource address. The implementation example is as follows:

{sharer, prevSharer, shareNO}←propagator, the previous propagator, and the propagation behavior identifier 2. The propagator parameter, the previous propagator parameter, and the propagation behavior identifier are combined into one parameter in the resource address. The implementation example is as follows:

path=sharer|prevSharer|shareNO←the three parameters are combined into a single propagation path parameter 3. The propagator parameter, the previous propagator parameter, and the propagation behavior identifier are combined into two parameters in the resource address. The implementation example is as follows:

node=sharer|shareNO&prevNode=prevSharer|prevShareNO←the propagation path node and the previous propagation path node 4. The propagator parameter, the previous propagator parameter, or the propagation behavior identifier is stored into a database, and a mapping is established in the resource address between a corresponding identifier and the propagator parameter, the previous propagator parameter, or the propagation behavior identifier in the database.

As a preferred embodiment of the present invention, the propagation behavior identifier is configured to a value acquired by converting a microsecond value into a base64 value. The conversion method is finding 64 characters to respectively represent 0 to 63, and the 64 characters are preferably 0-9, a-z, A-Z, -, and _.

As a preferred embodiment of the present invention, to enable the server to quickly collect statistics for the propagation depth of the resource address, the propagation path parameter further comprises the quantity of propagation layers, which may form propagation tree statistics for the resource address. Each time the resource address is propagated, the quantity of propagation layers is increased by 1. That is, the quantity of propagation layers in the propagated resource address is equal to one plus the quantity of propagation layers in the previous resource address. If the resource is original content, the value of this parameter is 0.

As a preferred embodiment of the present invention, to protect the resource address from unauthorized falsification and assembly, the resource address further comprises a parameter signature value.

The parameter signature value is acquired by performing an operation for the propagation path parameter in the resource address by using a signature algorithm. Since the parameter signature value may be changed if any parameter in the propagation path parameter is changed, it may be determined as whether the resource address is unauthorized falsification or assembly by detecting whether the signature value is changed.

In the embodiments of the present invention, it is limited that only the server where the resource address is located is capable of generating the parameter signature value, and hence only the resource server is capable of generating a new resource address.

In the embodiments of the present invention, the resource address is generated based on the URL address stipulated in the RFC 1738 standards for web resource access over the Internet.

An implementation example of the resource address in the present invention is as follows:

http://example.com/
rs_123.html?sharer=UID_s&prevSharer=UID_p&shareNO=aBCd12WxY&forwardLayer=1&sig=0123456789-abcdef The part before "?" pertains to the resource prefix.

"http" indicates a transfer protocol, "example.com" indicates the address of a server, the null network port number indicates a default value 80, and "/rs_123.html" indicates the path of a resource on the server.

The part following "?" indicates a propagation path parameter and a parameter signature value. Detailed data is described as follows:

Propagator parameter "sharer=UID_s" indicates who propagates the resource address, which is generally constituted by a user identifier. If the resource is original content, the propagator in the resource address refers to a content provider.

Previous propagator parameter "prevSharer=UID_p" indicates the resource address propagator propagates the resource address from the resource address propagated by user UID_p. The resource address carries this parameter, to enable the server to track the propagation path of the resource address to acquire the propagation of the content. If the resource is original content, the value of this parameter is an empty string.

Propagation behavior identifier "shareNO=aBCd12WxY" is used for retrospective analysis on the propagation path in combination with the previous propagator.

The quantity of propagator layers "forwardLayer=1" enables the server to quickly collect statistics for the propagation depth of the resource address, using which a propagation statistics tree may be formed for the resource address.

If the resource is an original resource, the value of this parameter is 0. Each time the resource address is propagated, the value of this parameter is increased by 1. That is, the quantity of propagation layers in the propagated resource address is equal to one plus the quantity of propagation layers in the previous resource address.

The parameter signature value "sig=0123456789abcdef" is used to protect the resource address from unauthorized falsification and assembly.

In a resource propagation process, the propagation path parameter is updated according to a login state and an identifier of a user propagating the resource address.

Figure 2:
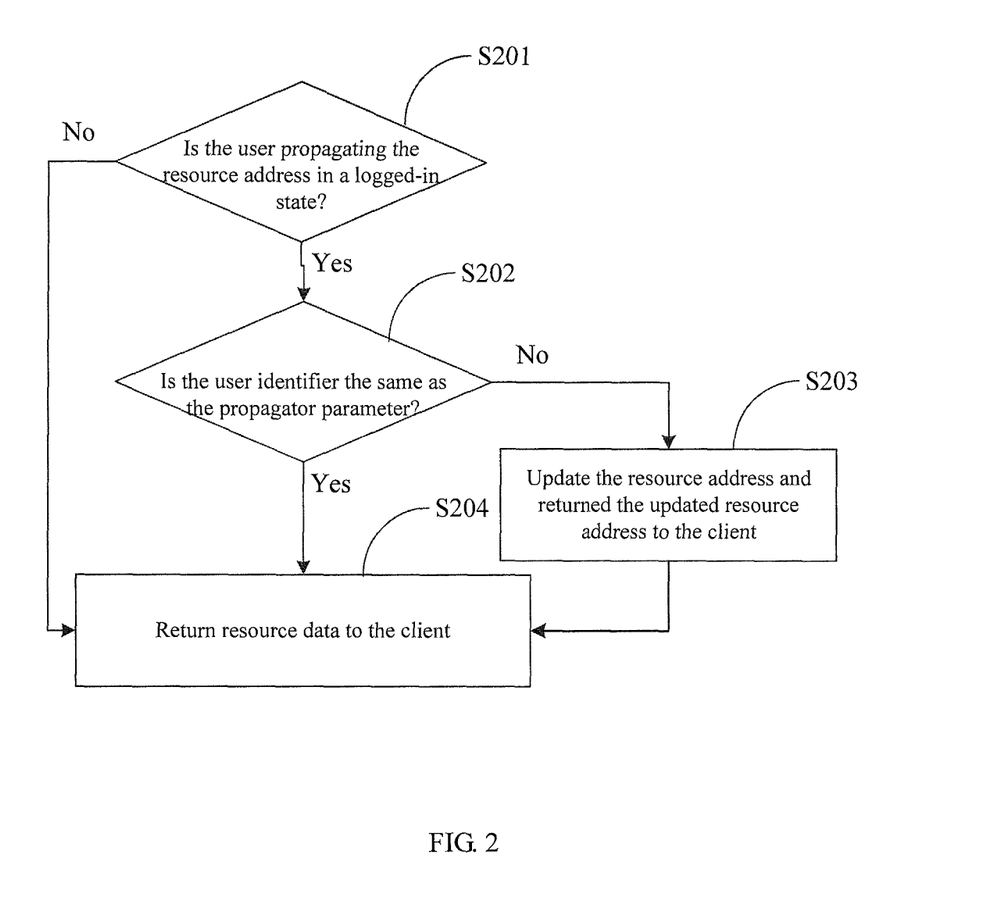
FIG. 2 is an implementation flowchart of updating a propagation path parameter according to a login state and an identifier of a user propagating the resource address according to an embodiment of the present invention.

FIG. 2 illustrates an implementation flowchart of updating a propagation path parameter according to a login state and an identifier of a user propagating the resource address according to an embodiment of the present invention.

In step S201, when the user propagates the resource address, it is detected whether the user is in a logged-in state; if the user is in the logged-in state, step S202 is performed; otherwise, step S204 is performed.

As an embodiment of the present invention, when a client propagates the resource address, a server may detect, via the cookie function, whether the user is in the logged-in state.

When the user has logged in to the client, the server generates a session ID, and sends the session ID to the client and saves the session ID in the cookie as a sessionKey field. In this way, the server only needs to detect whether the cookie in a request sent by a client browser comprises the sessionKey. If the cookie does not comprise the sessionKey, the user is detected as not in the logged-in state; and if the cookie comprises the sessionKey, a user identifier may be searched out according to the sessionKey.

In step S202, the user identifier that is used for the login is compared with a propagator parameter in the resource address to determine whether the user identifier that is used for the login is the same as the propagator parameter in the resource address. If they are the same, step S204 is performed; otherwise, step S203 is performed.

In step S203, the propagator parameter in the resource address is updated to the user identifier that is used for the login, the previous propagator parameter in the resource address is set as the propagator parameter before the update, and the propagation behavior identifier is calculated and updated.

As a preferred embodiment of the present invention, the propagation behavior identifier is configured to a value acquired by converting a microsecond value into a base64 value. The conversion method is finding 64 characters to respectively represent 0 to 63, and the 64 characters are preferably 0-9, a-z, A-Z, -, and _.

As an embodiment of the present invention, when the propagation path parameter comprises the quantity of propagation layers, each time the resource address is propagated, the quantity of propagation layers in the resource address is increased by 1.

As an embodiment of the present invention, when the resource address comprises a parameter signature value, the parameter signature value is recalculated according to the updated propagation path parameter.

After the resource address is updated, the updated resource address is assembled to an HTTP redirection header and the HTTP redirection header is returned to the client, and the client makes a response to the HTTP redirection request. The process returns to step S201.

In the embodiments of the present invention, if the user logging into the client propagates the resource address, the propagator parameter of the propagated resource address is the user identifier that is used for the login.

In step S204, resource data is returned to the client, and the client presents the resource to the user.

In the embodiments of the present invention, the user may perform the login operation before the resource propagation. After successful login, the page is refreshed and the process returns to step S201.

The user may also propagate content in a non-logged-in state. In this case, the propagated resource address is the same as the previous resource address, that is, the propagator parameter is not changed.

Figure 3:
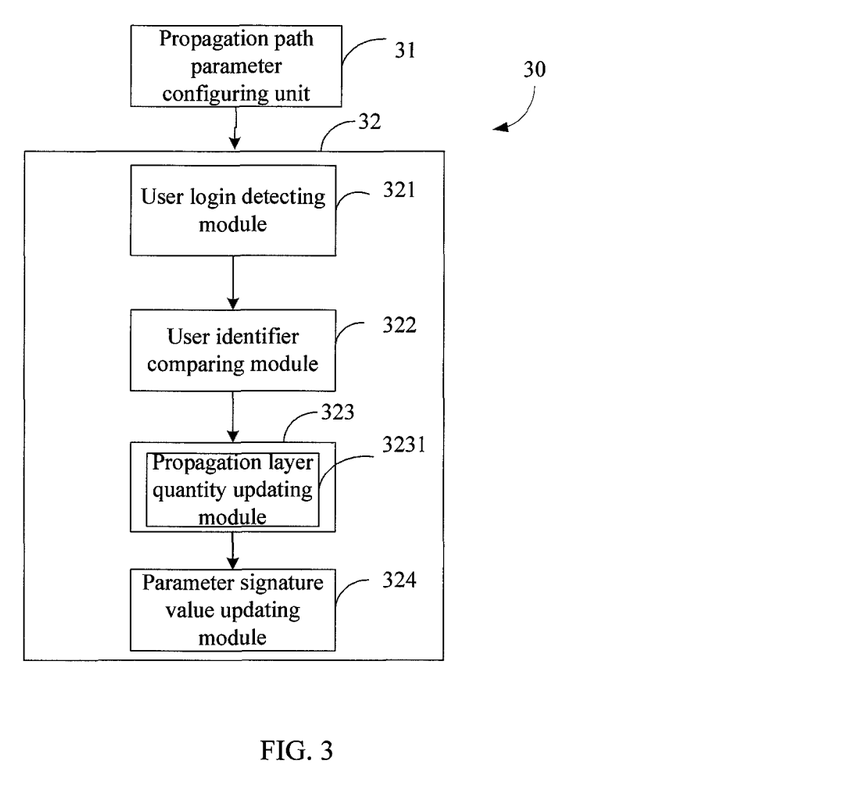
FIG. 3 is a structural view of an apparatus for generating a resource address according to an embodiment of the present invention.

FIG. 3 illustrates a structure of an apparatus for generating a resource address according to an embodiment of the present invention. For ease of description, parts relevant to the embodiments of the present invention are only illustrated.

The apparatus 30 for generating a resource address may be integrated or applied in a resource propagation system.

The resource propagation system may be an instant messaging tool, or such a social networking website as web blog and Weibo, a forum, a news releasing system, a multimedia releasing system for video or music releasing, various content releasing APPs, an application system, or the like.

The resource propagation system is configured on one or a plurality of resource propagation servers 160, and propagates the resource address to the Internet.

In the resource propagation process, the apparatus 30 for generating a resource address configures the propagation path parameter and the parameter signature value in the resource address, and updates the propagation path parameter during the resource propagation process, thereby implementing tracking of the propagation path of the resource address. In this way, the propagation of the resource address may be learned and statistical collection and analysis may be conducted for the propagation path of the resource address.

A propagation path parameter configuring unit 31 configures the propagation path parameter of the resource address in the resource address.

In a resource propagation process, a resource address updating unit 32 updates the propagation path parameter according to a login state and an identifier of a user propagating the resource address, and returns the updated resource address to a client that the user logs in to.

In the embodiments of the present invention, the propagation path parameter comprises:

a propagator parameter, used to identify a user that logs in to a client and propagates a current resource address, which indicates who propagates the resource address and is generally constituted by a user identifier that is used for the login; wherein if the resource is original content, the propagator refers to a content provider;

a previous propagator parameter, used to identify a previous propagator of the current resource address, which indicates who previously propagates a resource address propagated by the current propagator; wherein the resource address carries this parameter, to enable the server to track the propagation path of the resource address to acquire the propagation of the content; and if the resource is created by the propagator, the value of this parameter is an empty string; and a propagation behavior identifier, used to identify a primary resource address propagation behavior between the propagator and the previous propagator; wherein this parameter, in combination with the previous propagator parameter, may be used for a retrospective analysis on the propagation path.

As a preferred embodiment of the present invention, the propagation behavior identifier is configured to a value acquired by converting a microsecond value into a base64 value. The conversion method is finding 64 characters to respectively represent 0 to 63, and the 64 characters are preferably 0-9, a-z, A-Z, -, and _.

As a preferred embodiment of the present invention, to enable the server to quickly collect statistics for the propagation depth of the resource address, the propagation path parameter further comprises the quantity of propagation layers, which may form propagation tree statistics for the resource address. Each time the resource address is propagated, the value of this parameter is increased by 1. That is, the quantity of propagation layers in the propagated resource address is equal to one plus the quantity of propagation layers in the previous resource address. If the resource is created by the propagator, the value of this parameter is 0.

When the user propagates the resource address, a user login detecting module 321 detects whether the user is in a logged-in state.

When the user is in the logged-in state, a user identifier comparing module 322 determines whether the user identifier that is used for the login is the same as propagator parameters in the resource address.

When the user identifier that is used for the login is different from the propagator parameter in the resource address, a propagation path parameter updating module 323 updates the propagator parameter in the resource address to the user identifier that is used for the login, sets the previous propagator parameter in the resource address to the propagator parameter before the update, and calculates and updates a propagation behavior identifier.

As a preferred embodiment of the present invention, the propagation path parameter comprises quantity of propagation layers, used to indicate a propagation depth of the resource address.

Each time the resource address is propagated, a propagation layer quantity updating module 3231 increases the quantity of propagation layers in the resource address by 1.

As a preferred embodiment of the present invention, to protect the resource address from unauthorized falsification and assembly, the resource address further comprises a parameter signature value calculated according to the propagation path parameter.

A parameter signature value updating module 324 recalculates the parameter signature value according to the updated propagation path parameter.

In the embodiments of the present invention, it is limited that only the server where the resource address is located is capable of generating the parameter signature value, and hence only the resource server is capable of generating a new resource address.

Persons of ordinary skill in the art should understand that all or part of steps of the preceding methods may be implemented by hardware or hardware following instructions of programs. The programs may be stored in a non-transitory computer-readable storage medium, and may be executed by at least one processor. The storage medium may be a read only memory, a magnetic disk, or a compact disc-read only memory.

In the embodiments of the present invention, when the user is in the logged-in state, after the resource address is opened in a browser, a resource address carrying a propagator being the user identifier that is used for the login is displayed. In this way, the resource address may be propagated to other users via directly copying the text. When the user is not in the logged-in state, that is, when an anonymous user propagates the resource address, propagation of the resource address shall be taken as an extension of the propagation behavior of a previous logged-in user who opens the resource address, and the propagatable address displayed on the browser is the previous resource address.

It should be noted that, during generating of a resource address of content performed by the apparatus for generating a resource address according to the above embodiment, the apparatus is described by only using division of the above functional modules as an example. In practice, the functions may be assigned to different functional modules for implementation as required. To be specific, the internal structure of the resource propagation system is divided into different functional modules to implement all or part of the above-described functions. In addition, the apparatus for generating a resource address and the method for generating a resource address pertain to the same inventive concept. The specific implementation is elaborated in the method embodiments, which is not be detailed herein any further.

Figure 4:
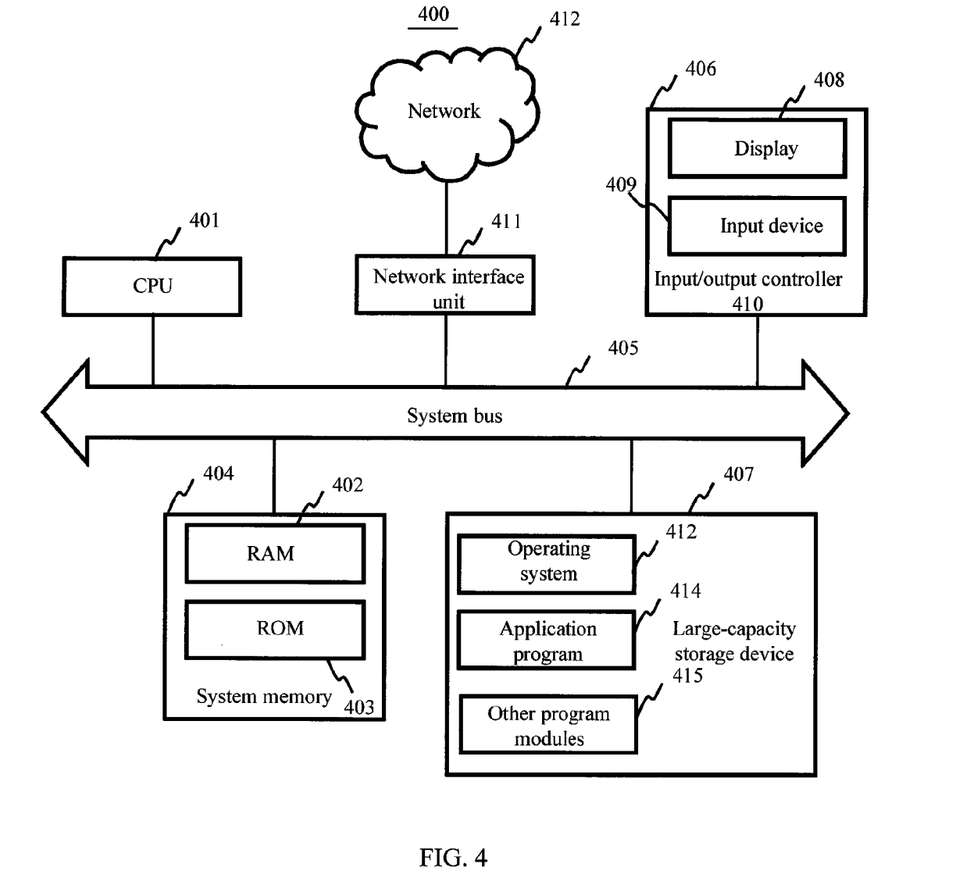
FIG. 4 is a schematic structural view of server according to an embodiment of the present invention.

FIG. 4 is a schematic structural view of a server according to an embodiment of the present invention.

The content server 140 and the resource propagation server 160 may both employ the structure illustrated in FIG. 4, to implement the method for generating a resource address.

A server 400 comprises a central processing unit (CPU) 401, a system memory 404 comprising a random access memory (RAM) 402 and a read-only memory (ROM) 403, and a system bus 405 communicatively connecting the system memory 404 and the CPU 401. The server 400 further comprises a basic input/output system (BIOS) 404 for facilitating information transmission between various components within a computer, and a large-capacity storage device 407 for storing an operating system 413, an application program 414, and one or more other program modules 415.

The BIOS 404 comprises a display 408 for displaying information, and an input device 409 such as a mouse and a keyboard, for information input by a user. The display 408 and the input device 409 are both communicatively connected to the CPU 401 via an input/output (I/O) controller 410 communicatively connected to the system bus 405. The BIOS 404 may further comprise the I/O controller 410 to receive and process inputs from such devices as a keyboard, a mouse, or an electronic stylus touch pen. Analogously, the I/O controller 410 further provides outputs to a display screen, a printer, or another type of output device.

The large-capacity storage device 407 is communicatively connected to the CPU 401 via a large-capacity storage controller (not illustrated in FIG. 4) communicatively connected to the system bus 405. The large-capacity storage device 407 and the non-transitory computer-readable storage medium associated therewith provide non-volatile storage for the server 400. To be specific, the large-capacity storage device 407 may include a non-transitory compute-readable storage medium (not illustrated in FIG. 4), for example, a hard disk or a CD-ROM driver.

Without loss of generality, the non-transitory computer-readable storage medium may comprise a computer storage medium and a communication media. The computer storage medium comprises volatile and non-volatile, movable and unmovable media that are implemented using any method and technology for storing information such as computer-readable instructions, data structures, program modules, or other data. The non-transitory computer-readable medium includes a RAM, a ROM, an EPROM, an EEPROM, a flash memory, or another such solid storage technology-based storage device; a CD-ROM, a DVD, or another such optical storage device; and a data cartridge, a magnetic card, a magnetic tape, or another such magnetic storage device. Nevertheless, a person skilled in the art may know that the non-transitory computer-readable storage medium is not limited to what are listed above. The system memory 404 and the large-capacity storage device 407 may be uniformly referred to as a memory.

According to the embodiments of the present invention, the server 400 may be further communicatively connected to a remote computer on the network via a network such as the Internet, and may run on the computer. To be specific, the server 400 may be communicatively connected to a network 412 via a network interface unit 411 communicatively connected to the system bus 405, or the server 400 may be communicatively connected to another type of network or a remote computer system (not illustrated in FIG. 4) via the network interface unit 411.

The memory further comprises at least one program. The at least one program is stored in the memory, and is configured to be performed by at least one central processing unit 401. The at least one program comprises instructions for performing the method for generating a resource address as illustrated in FIG. 2.

Persons of ordinary skill in the art should understand that all or part of steps of the above embodiments may be implemented by hardware or hardware following instructions of programs. The programs may be stored in a non-transitory computer-readable storage medium, and may be executed by at least one processor. The storage medium may be a read only memory, a magnetic disk, or a compact disc-read only memory.

By configuring the propagation path parameters in the resource address and updating the propagation path parameters in the resource address propagation process, embodiments of the present invention implement propagation path tracking of the resource address, facilitate acknowledgement of the propagation of the resource address, and perform a statistical collection for or an analysis on the propagation path of the resource address.

Detailed above are merely preferred embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A method for generating a resource address, comprising:
    configuring a propagation path parameter in the resource address; and
    updating the propagation path parameter in a resource propagation process, according to a login state and an identifier of a user propagating the resource address, and returning the updated resource address to a client that the user logs in to;
    wherein the propagation path parameter is used to uniquely identify a primary propagation behavior between a propagator of the resource address and a previous propagator thereof;
    wherein the propagation path parameter comprises:
        a propagator parameter, used to identify a user that logs in to a client and propagates a current resource address;
        a previous propagator parameter, used to identify a previous propagator of the current resource address; and
        a propagation behavior identifier, used to identify a primary resource address propagation behavior between the propagator and the previous propagator;
    wherein the updating the propagation path parameter according to a login state and an identifier of a user propagating the resource address comprises:
        when the user propagates the resource address, detecting whether the user is in a logged-in state;
        when the user is in the logged-in state, determining whether the user identifier that is used for the login is the same as the propagator parameter in the resource address; and
        when the user identifier that is used for the login is different from the propagator parameter in the resource address, updating the propagator parameter in the resource address to the user identifier that is used for the login, setting the previous propagator parameter in the resource address as the propagator parameter before the update, and calculating and updating a propagation behavior identifier.

2. The method for generating a resource address according to claim 1, wherein the resource address further comprises:
    a parameter signature value calculated according to the propagation path parameter.

3. The method for generating a resource address according to claim 2, further comprising:
    recalculating the parameter signature value according to the updated propagation path parameter.

4. The method for generating a resource address according to claim 1, wherein the propagation behavior identifier is configured to a value that is acquired by converting a microsecond value of a UNIX time during propagation of the resource address into a base64 value.

5. The method for generating a resource address according to claim 1, wherein the propagation path parameter further comprises:
   quantity of propagation layers, used to indicate a propagation depth of the resource address; and
   wherein each time the resource address is propagated, the quantity of propagation layers in the resource address is increased by 1.

* * * * *